(No Model.) 2 Sheets—Sheet 1.
J. T. LEE.
EXHAUST NOZZLE EXTENSION FOR LOCOMOTIVES.
No. 392,350. Patented Nov. 6, 1888.
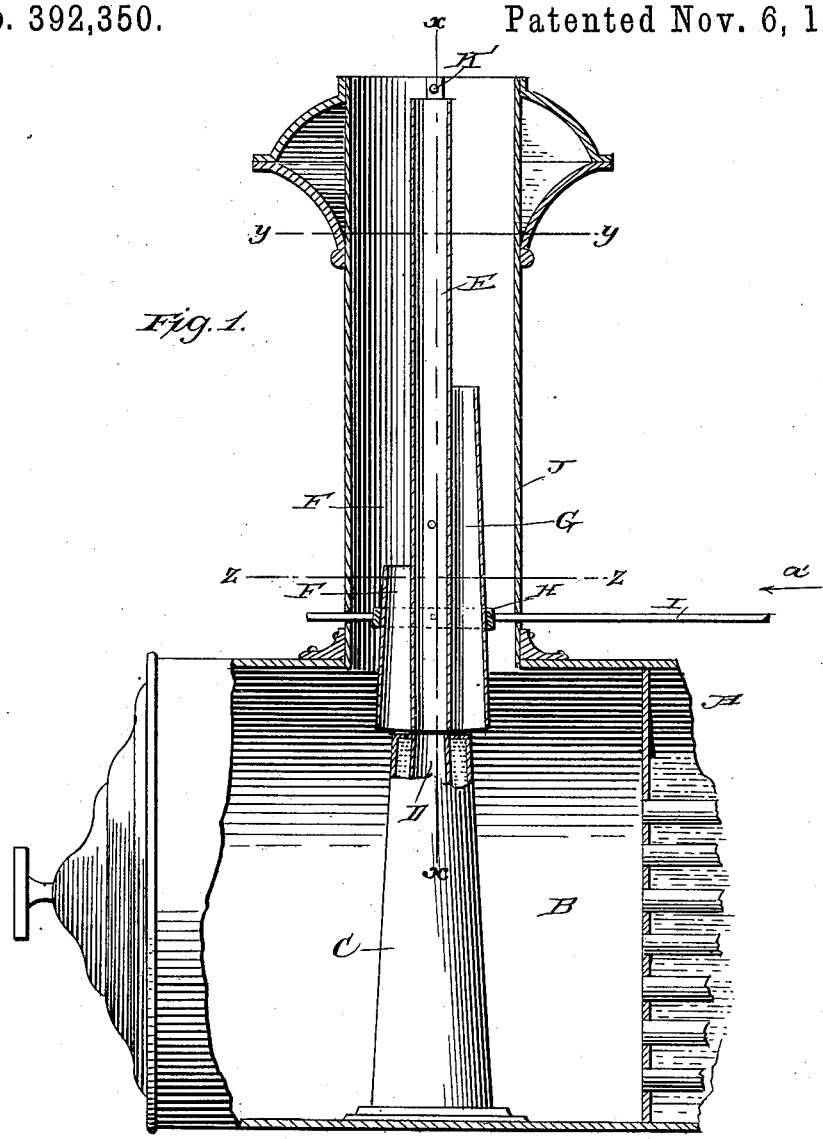
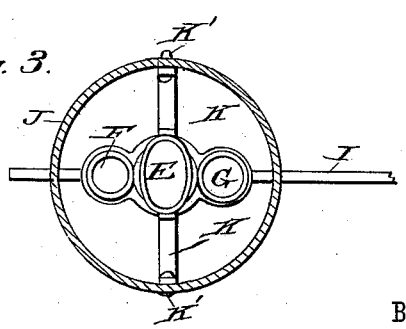
WITNESSES:
N. R. Davis.
C. Sedgwick.
INVENTOR:
J. T. Lee
BY Munn & Co
ATTORNEYS.

(No Model.) 2 Sheets—Sheet 2.
J. T. LEE.
EXHAUST NOZZLE EXTENSION FOR LOCOMOTIVES.
No. 392,350. Patented Nov. 6, 1888.
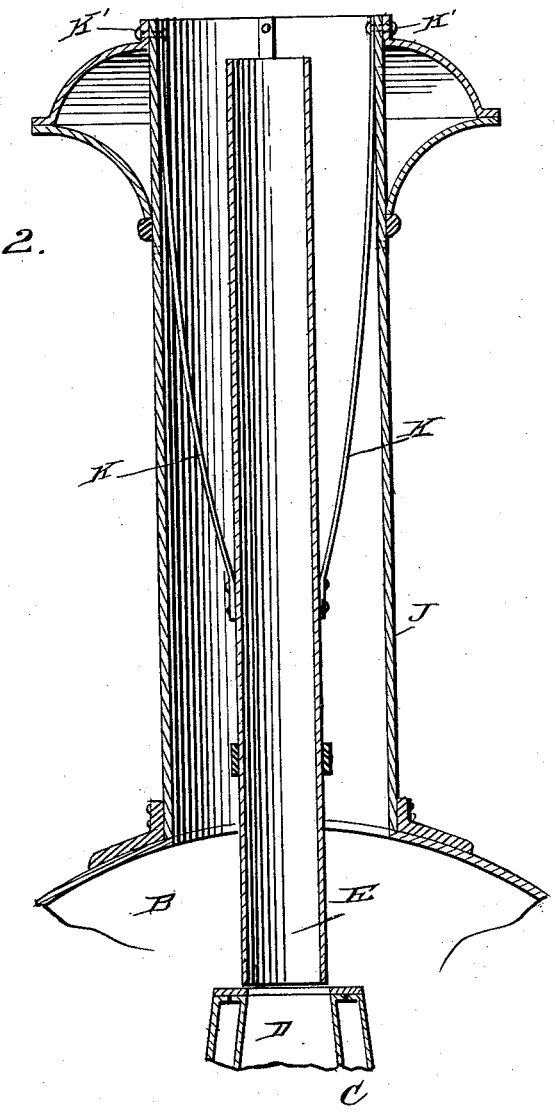
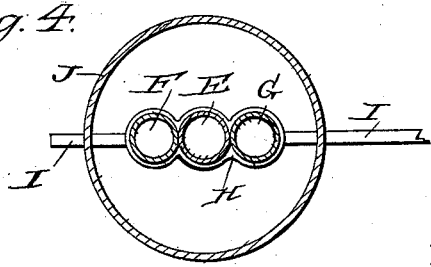
WITNESSES:
W. R. Davis
C. Sedgwick
INVENTOR:
J. T. Lee
BY Munn & Co.
ATTORNEYS.

UNITED STATES PATENT OFFICE.

JULIUS THOMAS LEE, OF MATTOON, ILLINOIS.

EXHAUST-NOZZLE EXTENSION FOR LOCOMOTIVES.

SPECIFICATION forming part of Letters Patent No. 392,350, dated November 6, 1888.

Application filed February 15, 1888. Serial No. 264,105. (No model.)

*To all whom it may concern:*

Be it known that I, JULIUS THOMAS LEE, of Mattoon, in the county of Coles and State of Illinois, have invented a new and Improved Exhaust-Nozzle Extension for Locomotives, of which the following is a full, clear, and exact description.

The object of the invention is to provide a new and improved exhaust-nozzle extension for locomotives, whereby the engineer is enabled to regulate the draft of the fire to any desired degree.

The invention consists of pipes of varying lengths movably supported above the stand-pipe and adapted to alternately register therewith.

Reference is to be had to the accompanying drawings, forming a part of this specification, in which similar letters of reference indicate corresponding parts in all the figures.

Figure 1 is a sectional side elevation of the improvement as applied. Fig. 2 is an enlarged longitudinal section of the same on the line $x\ x$ of Fig. 1. Fig. 3 is a sectional plan view of the same on the line $y\ y$ of Fig. 1, and Fig. 4 is a like view of the same on the line $z\ z$ of Fig. 1.

The locomotive-boiler A, of any approved construction, is provided at its front end with the usual smoke-box, B, in which extends the stand-pipe C, connected in the usual manner with the steam-chest of the cylinders, so that the exhaust-steam from the latter passes up through the said stand-pipe C. The upper end, D, of the stand-pipe C is adapted to be connected alternately with the lower ends of the pipes E, F, and G, held above the stand-pipe C and secured to a ring or yoke, H, supported by a rod, I, held to slide in suitable bearings on the smoke-stack G, and extending to the cab of the locomotive. The pipes E, F, and G are thus rigidly secured to each other, and the said pipes are of different lengths, as is plainly shown in Fig. 1. The central pipe, E, is oval at the top, preferably cylindrical at bottom, while the outer pipes, F and G, are slightly conical, as shown. To the middle pipe, E, are secured on opposite sides the hangers K K, pivotally secured at K' to the extreme top of the inside of the smoke-stack J, as is illustrated in Fig. 2.

The operation is as follows: In the position shown in Fig. 1 the central pipe, E, registers with the upper end, D, of the stand-pipe C, so that the exhaust-steam from the cylinders of the engines passes through the stand-pipe C, and through the extension-pipe E into the upper end of the smoke-stack J, and from the latter out to the open air. It will be seen that the draft created by the exhaust-steam passing into the upper part of the smoke-stack J is very little, as the said extension-pipe E discharges the exhaust-steam near the outer end of the smoke-stack J. Now, when the engineer desires to increase the draft in the boiler-flues, he moves the rod I in the direction of the arrow $a'$, so that the extension-pipes E, F, and G swing with the hanger K until the lower end of the pipe G registers with the upper end, D, of the stand-pipe C. The pipes E and F are then disconnected from the stand-pipe C, and the exhaust-steam from the engines of the locomotive passes through the stand-pipe C and through the extension-pipe G, which opens into the smoke-stack J a considerable distance below its upper end. The escaping steam thus entering the smoke-stack J at this point creates considerable draft before the said steam passes out through the upper end of the smoke-stack J. If the engineer desires to increase the draft still more, he moves the rod I in the inverse direction of the arrow $a'$ until the shortest extension-pipe, F, registers at its lower end with the upper end of the stand-pipe C. The exhaust-steam is now discharged into the lower part of the smoke-stack J, thereby creating considerable draft in the smoke-box B and the boiler-flues. Thus it will be seen that the engineer is enabled to increase or diminish the draft on the fire to any desired degree.

Having thus described my invention, what I claim as new, and desire to secure by Letters Patent, is—

1. The combination, with a locomotive stack and stand-pipe, of pipes of varying lengths movably supported in the stack above the stand-pipe, and means for moving the said pipes to cause them to register alternately with the stand-pipe, substantially as described.

2. The combination, with the locomotive stand-pipe, smoke-box, and smoke-stack, of a series of pipes of various lengths held to swing in the said smoke-stack and adapted to be connected at their lower ends with the upper end of the said stand-pipe, substantially as shown and described.

3. The combination, with a locomotive stand-pipe, smoke-box, and smoke-stack, of a series of pipes of various lengths and secured to each other, said pipes being pivoted in and at the extreme top of said smoke-stack, and a rod fastened to the said pipes and extending to the cab of the locomotive, substantially as shown and described.

J. THOMAS LEE.

Witnesses:
G. S. RICHMOND,
C. E. WILSON.